E. H. FARMAN.
PALMETTO ROOT AND WEED PLOW.
APPLICATION FILED JAN. 19, 1918.
1,271,504.
Patented July 2, 1918.
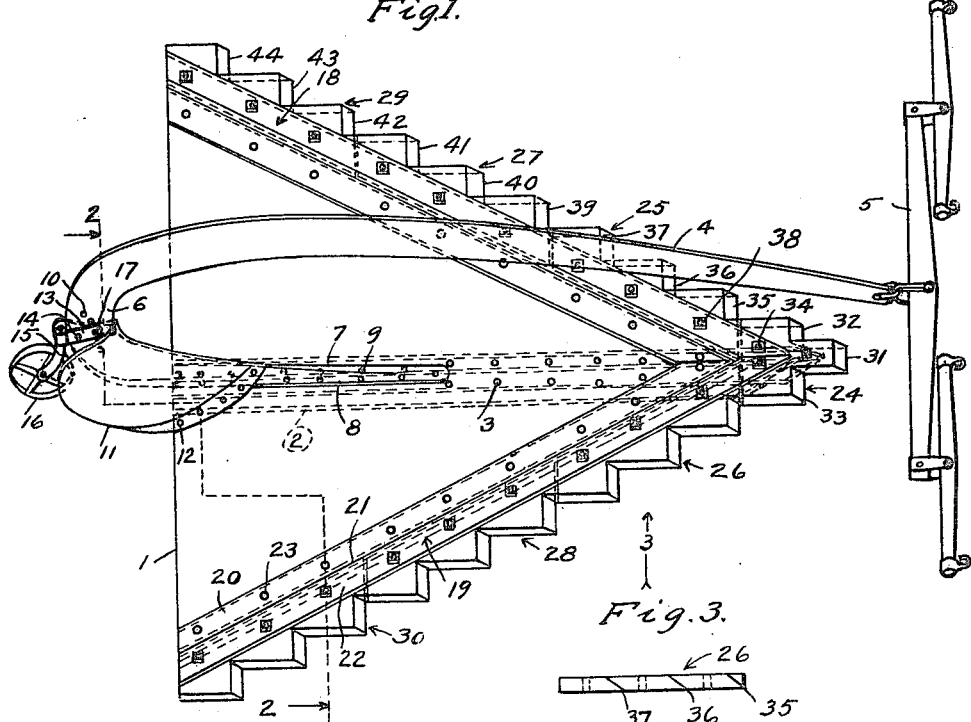
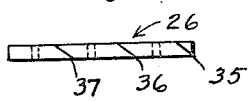
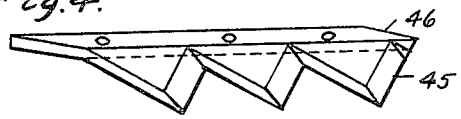
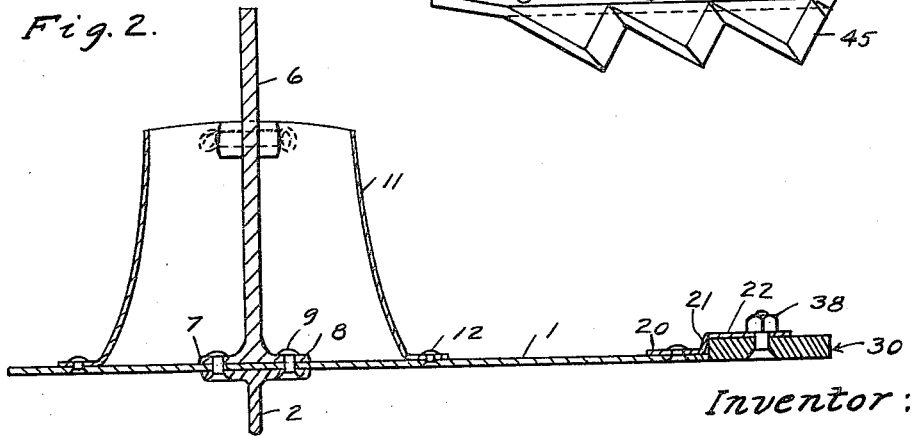
Inventor:
Elbert H. Farman,
by Hazard & Miller
Att'ys.

UNITED STATES PATENT OFFICE.

ELBERT H. FARMAN, OF McKITTRICK, CALIFORNIA.

PALMETTO-ROOT AND WEED PLOW.

1,271,504.   Specification of Letters Patent.   Patented July 2, 1918.

Application filed January 19, 1918. Serial No. 212,715.

*To all whom it may concern:*

Be it known that I, ELBERT H. FARMAN, a citizen of the United States, residing at McKittrick, in the county of Kern and State of California, have invented new and useful Improvements in Palmetto-Root and Weed Plows, of which the following is a specification.

My object is to make a plow suitable for cutting palmetto roots, weeds, and the like, and my invention consists in the novel features herein shown, described and claimed.

Figure 1 is a perspective of a palmetto root and weed plow embodying the principles of my invention.

Fig. 2 is an enlarged vertical cross-sectional detail on the line 2—2 of Fig. 1.

Fig. 3 is an edge view of a section of the cutter bar as seen looking in the direction indicated by the arrow 3 in Fig. 1.

Fig. 4 is a detail perspective of a section of the cutter bar and showing a modified form.

The cutter bar frame 1 is formed of heavy sheet metal, is A-shaped in plan, and flat. A T-bar 2 is placed below and half-way between the rear corners of the plate 1 and extends to the point, said T-bar being secured in position by rivets 3, so as to stiffen the plate. The plow beam 4 is adapted for the reception of a pair of whiffletrees 5 and the plow beam extends backwardly from the front end a suitable distance and then is turned downwardly to form a standard 6, and horizontal flanges 7 and 8 are formed upon the lower end of the standard 6 and said flanges are secured in place by passing the rivets 9 through the T-bar 2, through the plate 1, and through the flanges 7 and 8. A vertical row of bolt holes 10 is formed through the standard 6. A double mold board 11 is placed against the front edge of the standard 6 and extends backwardly and outwardly both ways from the standard and is secured to the plate 1 along its lower edges by rivets 12. An arm 13 is pivotally secured to the standard 6 above the mold board 11 by a bolt 14, and the stem 15 of the caster wheel 16 is mounted vertically in the rear end of the arm. The bolt 17 is inserted through bolt holes in the forward end of the arm 13 and through one of the bolt holes 10 so that by manipulating the bolt and selecting the proper hole 10 the caster wheel 16 may be adjusted relative to the plow beam.

The supporting plates 18 and 19 are Z-shaped in cross-section and comprise the inner flanges 20, the off-set central portions 21, and the outer flanges 22. The inner flanges 20 are secured along the side edges and upper face of the plate 1 by rivets 23. The cutter bars comprise the front section 24, the sections 25 and 26 extending backwardly from the front section, the sections 27 and 28 extending backwardly from the sections 25 and 26, and the rear sections 29 and 30. The cutter bar sections are considerably thicker than the plate 1 and the off-set 21 makes up for this thickness so that the cutter bar sections will fit under the flanges 22 with their lower faces flush with the lower face of the plate 1. The cutter bar section 24 comprises the cutting edges 31, 32 and 33 formed of a rectangular block having two opposite corners notched out so that the cutting edges 32 and 33 are half way to the base of the block from the edge 31, and said cutting edges being in transverse planes. The section 24 is secured to the forward ends of the flanges 22 by bolts 34. The section 25 consists of the cutting edges 35, 36 and 37. The inner edge of the bar having the cutting edges 35, 36 and 37 fits against the edge of the plate 1 and against the off-set 21, and the bar is secured in place by bolts 38. In a like manner the section 27 consists of cutting edges 39, 40 and 41, and the section 29 consists of cutting edges 42, 43 and 44. The cutter bars are made in sections, preferably of three cutting edges to a section, so that individual sections may be taken out, repaired and ground. The sections 26, 28 and 30 are identical with the sections 25, 27 and 29 except that one bar is right-handed and the other is left-handed. The cutting edges 31, 32 and 33 and the like are all beveled upwardly and backwardly from the lower faces of the cutter bars and they are all on transverse planes, and the lines connecting the outer ends of the cutting edges to the inner ends of the succeeding edges are longitudinal and at right angles to the cutting edges.

The plate 1 carrying the supporting plates 18 and 19 forms a double plow share especially adapted for moving along upon or below the surface of the ground, as required to cut palmetto brush, vines, weeds and the like, loose from the ground.

The cutter bars shown in Figs. 1 and 3 are flat, while in Fig. 4 I have shown a section of a cutter bar in which the cutting edges 45 are inclined relative to the attaching plate 46, the object being to make a cutter bar draw into the ground more or less, and the force with which the cutting edges scrape the ground or cut below the surface of the ground may be regulated to some extent by adjusting the bolt 17 to throw more or less weight of the plow upon the caster wheel 16.

The draft animals are attached to the whiffletrees 5 and driven back and forth over the ground to be cleared, and the cutter bars will loosen the brush, vines, etc., from the ground and the driver will pull the vines to one side or the other after they collect against the standard 6, the principal purpose of the plow being simply to cut the connections between the brush and the ground.

When the plow is to be used for cutting weeds, I adjust the plow beam 4 by moving the same forward in the direction of the apex of my plow and fasten the same in the position desired.

While I have shown the knives as arranged horizontally in plane with the body of the plow, I may find it advantageous to construct the same inclined either upwardly or downwardly from the central portion of the plow, and do not limit myself to the construction of the knives as shown in the drawings.

Various changes may be made in the details of construction without departing from the spirit of my invention as claimed.

I claim:

1. A palmetto plow comprising a cutter bar frame formed of heavy sheet metal, A-shaped in plan, and flat, a T-bar placed below and half way between the rear corners of the frame and extending to the point and rigidly secured in position so as to stiffen the frame, a plow beam adapted for the reception of the draft rigging and extending backwardly and then downwardly to form a standard, horizontal flanges formed upon the lower end of the standard and fitting upon the cutter bar frame, rivets inserted through the flanges, through the cutter bar frame and through the T-bar; there being a vertical row of bolt holes through the standard; an arm pivotally secured to the standard, a caster wheel connected to the rear end of the arm, and a bolt removably inserted through one of the series of bolt holes so that by moving the bolt from hole to hole the position of the caster wheel may be adjusted.

2. In a palmetto plow, a cutter bar frame formed of heavy sheet metal, A-shaped in plan, and flat, a T-bar placed below and half way between the rear corners of the frame and extending to the point and rigidly secured in place, Z-shaped supporting plates secured to the side edges of the cutter bar frame, cutter bars secured to the supporting plates against the side edges of the cutter bar frame; the lower faces of the cutter bars being flush with the lower face of the cutter bar frame; and cutting edges upon the cutter bars; said cutting edges being in transverse lines.

3. In a palmetto plow, a cutter bar frame formed of heavy sheet metal, A-shaped in plan, and flat, a T-bar placed below and half way between the rear corners of the frame and extending to the point and rigidly secured in place, Z-shaped supporting plates secured to the side edges of the cutter bar frame, cutter bars secured to the supporting plates against the side edges of the cutter bar frame; the lower faces of the cutter bars being flush with the lower face of the cutter bar frame; and cutting edges upon the cutter bars; said cutting edges being in transverse lines and said cutting edges being inclined outwardly and downwardly.

In testimony whereof I have signed my name to this specification.

ELBERT H. FARMAN.

Copies of this patent may be obtained for five cents each, by addressing the "Commissioner of Patents, Washington, D. C."